Feb. 15, 1944.  J. LABOULAIS  2,342,055
THRUST BEARING
Filed July 1, 1943  3 Sheets-Sheet 1
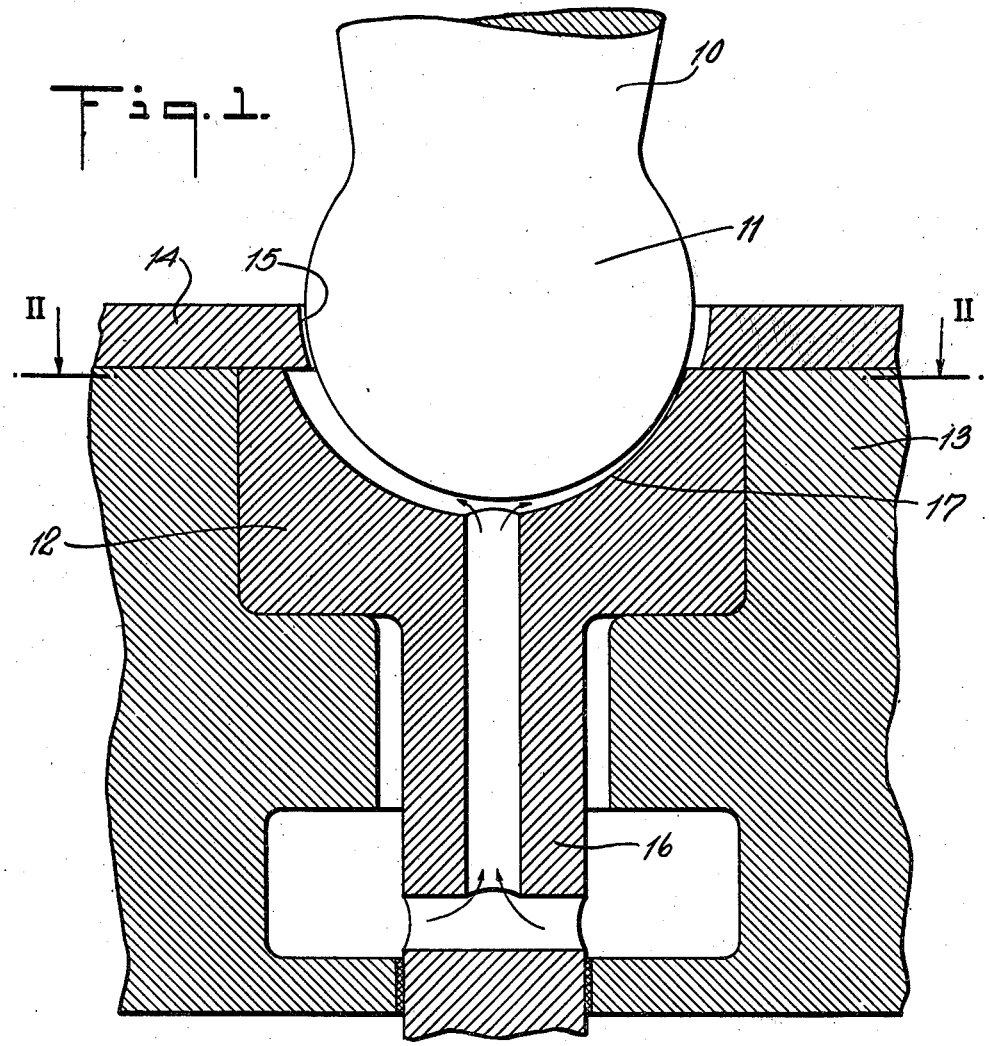
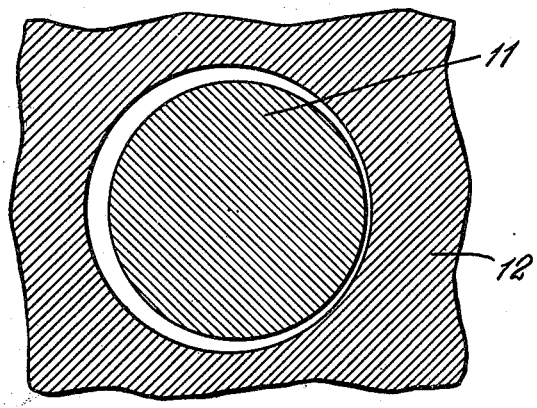
INVENTOR
JEAN LABOULAIS
BY
HIS ATTORNEY

INVENTOR
JEAN LABOULAIS
HIS ATTORNEY

Feb. 15, 1944. J. LABOULAIS 2,342,055
THRUST BEARING
Filed July 1, 1943 3 Sheets-Sheet 3
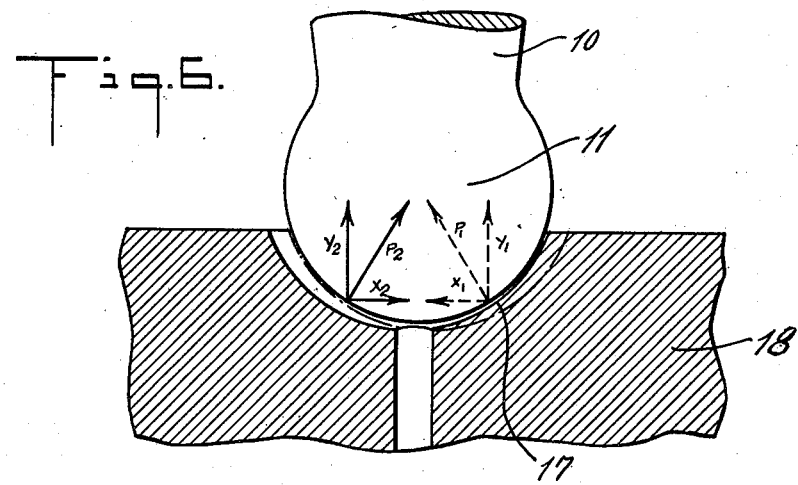
Fig. 6.
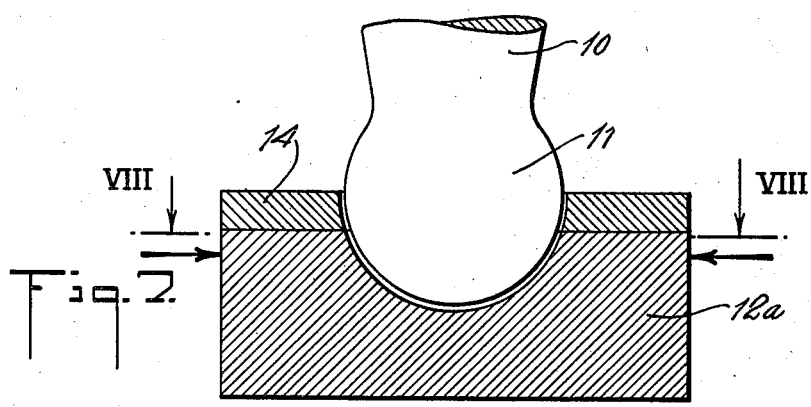
Fig. 7.
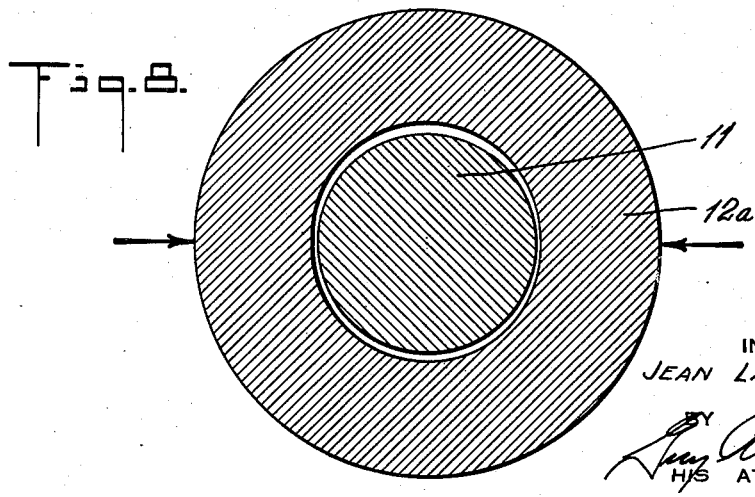
Fig. 8.
INVENTOR
JEAN LABOULAIS
HIS ATTORNEY Patented Feb. 15, 1944

2,342,055

UNITED STATES PATENT OFFICE 2,342,055

THRUST BEARING

Jean Laboulais, Greenwich, Conn., assignor to Auto-Ordnance Corporation, a corporation of New York Application July 1, 1943, Serial No. 492,981

8 Claims. (Cl. 308—168)

My invention relates to a thrust bearing and more particularly a thrust bearing wherein a shaft has a spherical end formed thereon which supports the shaft and turns in a stationary bearing element.

One object of the invention is to provide a thrust bearing of novel design which is so constructed that it will act to maintain the desired centralization of the shaft without auxiliary guide bearing. Another object of the invention is to provide a thrust bearing without bearing shoes. A further object is to provide a journal and bearing elements so arranged that lubricating oil wedges will be formed during rotation, the orientation of the oil wedges being such that there will be a vertical component of oil pressure acting upon the shaft and its load in opposition to the reaction of gravity.

Other objects and advantages of the invention will be apparent upon consideration of the present specification.

The invention is shown by way of illustration in the accompanying drawings, wherein—

Figure 1 is a vertical midsection through a bearing constructed in accordance with the invention, a part of the shaft and its spherical thrust footing being shown in elevation;

Figure 2 is a horizontal section on the line II—II of Figure 1, shown on a reduced scale;

Figure 6 is a diagrammatic view showing the action of the wedges of lubricating oil upon the thrust footing in the bearing illustrated in Fig. 4;

Figure 7 is a vertical mid-section through another bearing constructed in accordance with the invention, a part of the shaft and its spherical thrust footing being shown in elevation; and Figure 8 is a horizontal section on the line VIII—VIII of Figure 7, as viewed in the direction of the arrows.

In all these figures, the clearance is shown greatly exaggerated.

Figure 3:
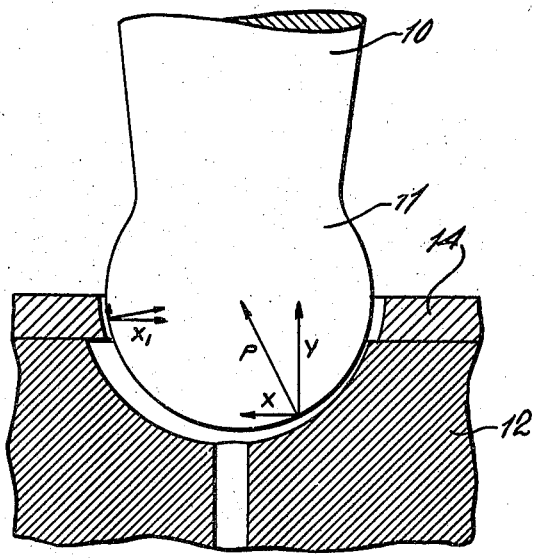
Figure 3 is a diagrammatic view showing the action of a wedge of lubricating oil upon the thrust footing shown in Figure 1.

In the form of the invention illustrated in Figs. 1, 2, and 3, a shaft 10 has a spherical thrust footing 11 formed on its lower end which rotates in a bearing element 12, whereby the shaft is supported.

As here shown the bearing element 12 is housed in and supported by a base block 13, in which it is free to rotate in a horizontal plane beneath the shaft 10.

A guide plate 14 is fixed to the top of the base block 13, and has a central opening 15 therein through which the footing 11 projects to meet the bearing element 12. The guide plate 14 is constructed and arranged to surround the footing 11 closely, substantially at its greatest horizontal diameter, and serves to keep the footing centered in the apparatus. Clearly it is not necessary to form the guide plate as a member separate from the base block 13.

The bearing element 12 shown in Figs. 1, 2 and 3 has a stem 16 formed thereon, extending downwardly therefrom. The axis of the stem 16 and of the bearing element 12 is displaced from the axis of the shaft 10. Thus, by turning the stem 16, the bearing element 12 may be rotated in the base block 13 about a vertical axis which is eccentric with respect to the axis of the shaft 10.

The bearing element 12 has a spherical depression 17 formed in its upper face which is eccentrically disposed with respect to axis of the stem 16 and the bearing element 12. Thus, by turning the stem and rotating the bearing element, the spherical depression can be centered beneath the spherical thrust footing 11. By turning the stem still further, the spherical depression can be turned eccentrically with respect to the footing 11 until a minimum clearance exists between the side of the depression and the footing, as shown in Figs. 1, 2 and 3.

When the footing and the bearing element are positioned as last described, rotation of the shaft has a shearing effect on the lubricant and creates an oil film in the usual manner characteristic of "thick film" lubrication. This film will be wedge-shaped because of the eccentricity of the bearing element with respect to the guide plates, and, as is well known, the pressure distribution in such an oil wedge is highly unsymmetrical.

The effective force on the journal due to this pressure distribution may be resolved into a horizontal component X and a vertical component Y, as shown in Fig. 3.

The rotation of the shaft will also produce an oil wedge between the guide plate 14 and the journal with the thinnest portion of this wedge diametrically opposite to that of the wedge just described.

The horizontal force on the journal due to the pressure distribution in this oil wedge between the guide plate 14 and journal 11 as illustrated by the arrow $X^1$ in Fig. 3, will counteract the horizontal component X of the lower wedge. The vertical component Y provides the desired thrust properties of the bearing, supporting the shaft and its load.

Thus, by eccentrically disposing the stem 16, oil or other lubricant will be forced between the footing and the bearing element in desired degree, and the effective force of the oil wedge may be caused to oppose the force of gravity from substantially zero to a point limited only by the design of the apparatus, the speed of the shaft and the viscosity of the oil or lubricant.

Figure 4:
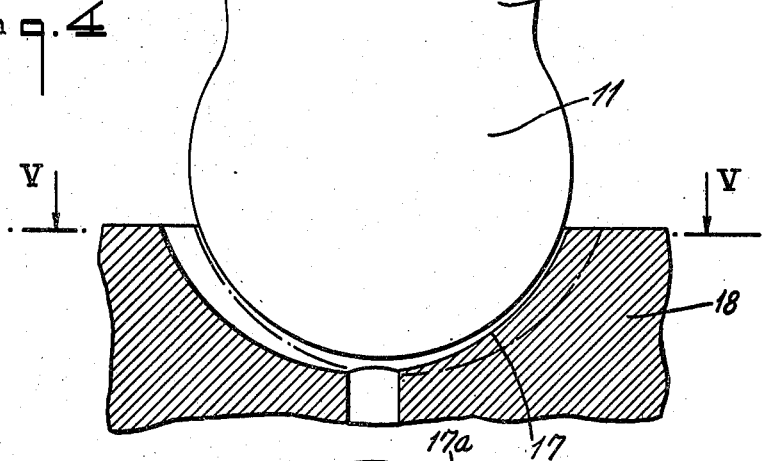
Figure 4 is a vertical mid-section through another bearing constructed in accordance with the invention, a part of the shaft and its spherical thrust footing being shown in elevation.
Figure 5:
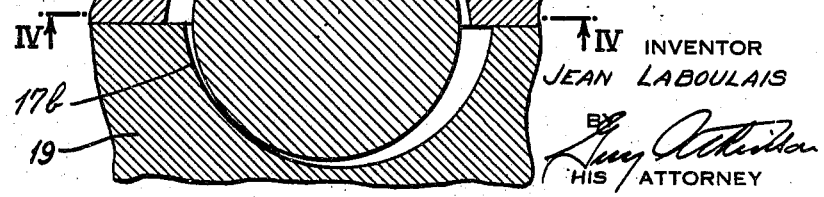
Figure 5 is a plan view of the bearing shown in Fig. 4, shown on a reduced scale.

In the embodiment of the invention illustrated in Figs. 4, 5 and 6, a like result is obtained by providing a bearing element which is split substantially in half in a vertical plane which includes the axis of the shaft 10. Thus the bearing element is formed in two parts 18 and 19, each of them having one half of a spherical depression 17a or 17b formed therein.

By shifting the halves 18 and 19 along the plane of contact, it is possible to draw one half into close proximity to the footing 11 on one side thereof and to draw the other half into close proximity to the footing on the opposite side. Thus, as illustrated in Fig. 5, the half 18 is shifted to the left and the half 19 is shifted to the right to produce two oppositely disposed wedges for the oil or other lubricant. As the shaft turns in a clockwise direction as seen in Fig. 5, it exerts a shearing action upon the oil or lubricant which it drags into these two areas with a result analogous to that described in connection with the embodiment illustrated in Figs. 1, 2, and 3.

Accordingly, oil or lubricant is pulled by rotation of the shaft into two areas of small clearance caused by the approach of the two halves toward the outer surface of the spherical footing. There results, therefore, two lines of oil pressure $P_1$ and $P_2$ which may be resolved into horizontal components $X_1$ and $X_2$ and vertical components $Y_1$ and $Y_2$. The horizontal components tend to balance each other without the aid of a guide plate 14, and the vertical components work together to oppose the force of gravity.

Another embodiment is shown in Fig. 7, in which the spherical bearing element is elastically distorted by applying compression at two exterior points on opposite sides of the bearing. The distortion produces two symmetrically disposed wedges. The lubricating films formed in these wedges by shaft rotation will have such pressure distributions that there will be a resultant upward thrust. Because of the symmetry, the horizontal forces will cancel. This method of producing a distortion of the spherical surface is not limited to this embodiment but can include any method of applying compression, tension or torsion to produce the proper distortion.

Clearly, oil or other lubricant may be supplied to the bearing in any known or convenient manner, which does not require illustration in the drawings.

From the foregoing it will be evident that the present invention provides a thrust bearing with definitely located oil wedges; wherein the oil wedges are produced in such manner as to create a substantial opposition to the action of gravity.

The present invention makes it unnecessary to employ the usual shoes whereby oil wedges are generally created beneath thrust bearings. Furthermore, the usual guide bearing may also be omitted. As a result, the bearing is not only simplified, but spherical thrust bearings constructed in accordance with my invention may be used in very small units such as gyroscopes or portable tools. A bearing constructed in accordance with the invention is simple, easily operated and ruggedly durable.

The forms of the invention here described and illustrated in the drawings are presented merely to indicate how the invention may be applied. Other forms differing in detail but not in substance from those here specifically disclosed will readily suggest themselves to those dealing with such problems, without departing from the proper scope of the appended claims.

I claim:

1. A thrust bearing comprising a shaft, a thrust footing formed on said shaft, and a bearing element adjustable eccentrically with respect to said shaft to form a wedge-shaped film between said footing and said bearing element.

2. A thrust bearing comprising a shaft, a thrust footing formed on the end of said shaft, and a bearing element adjustable eccentrically with respect to the axis of said shaft to form a wedge-shaped film between said footing and said bearing element.

3. A thrust bearing comprising a shaft, a thrust footing formed on said shaft, and a two part bearing element for supporting said footing, each part of said bearing element being adjustable eccentrically with respect to said shaft to form a wedge-shaped film of lubricant between said footing and said bearing element.

4. A thrust bearing comprising a shaft, a thrust footing formed on said shaft, and a two part bearing element for supporting said footing, each part of said bearing element being adjustable eccentrically with respect to said shaft to form a wedge-shaped film of lubricant between said footing and said bearing element.

5. A thrust bearing comprising a shaft, a spherical thrust footing formed on the end of said shaft, and a relatively fixed retaining member surrounding said footing, in combination with an adjustable bearing element operably associated with said fixed retaining member to form a wedge-shaped film between said footing and said bearing element.

6. A thrust bearing comprising a shaft, a spherical thrust footing formed on the end of said shaft, and a relatively fixed retaining member surrounding said footing, in combination with a bearing element operably associated with said fixed retaining member, said bearing element being adjustable eccentrically with respect to the axis of said shaft to control a supply of lubricant between said footing and said bearing element.

7. A vertical thrust bearing comprising a shaft, a spherical thrust footing formed on the lower end of said shaft, and a relatively fixed horizontal retaining member surrounding said footing, in combination with a horizontally adjustable bearing element operably associated with said fixed retaining member, said bearing element being adjustable horizontally with respect to the axis of such shaft to control a supply of lubricant between said footing and said bearing element.

8. A thrust bearing comprising a shaft, a spherical thrust footing formed on the end of said shaft, and a relatively fixed retaining member surrounding said footing, in combination with a pair of bearing elements operably associated with said fixed retaining member, said bearing elements being separately adjustable eccentrically with respect to the axis of said shaft to control a supply of lubricant between said footing and said bearing elements.

JEAN LABOULAIS.